(12) United States Patent
Perera et al.

(10) Patent No.: US 7,855,170 B2
(45) Date of Patent: Dec. 21, 2010

(54) HOMOGENOUS SYNTHETIC MUD-TO-CEMENT CEMENTING GLASSES

(75) Inventors: Yibran Perera, San Antonio de los Altos (VE); Virginia Buccellato, San Antonio de los Altos (VE); George Quercia, Caracas (VE); Aiskely Blanco, San Antonio de los Altos (VE)

(73) Assignee: INTEVEP, S.A., Caracas (VE)

( * ) Notice: Subject to any disclaimer, the term of this patent is extended or adjusted under 35 U.S.C. 154(b) by 212 days.

(21) Appl. No.: 12/123,610

(22) Filed: May 20, 2008

(65) Prior Publication Data

US 2009/0288830 A1    Nov. 26, 2009

(51) Int. Cl.
  *C09K 8/50* (2006.01)
  *C04B 35/00* (2006.01)

(52) U.S. Cl. .......................... 507/269; 65/17.3; 65/19; 106/286.1; 106/286.2; 106/286.3; 106/286.5; 106/286.6; 106/286.7; 106/287.34; 501/153; 501/154; 501/155; 507/271

(58) Field of Classification Search ................ 507/269, 507/271; 65/17.3, 19; 106/286.1–286.3, 106/286.5–286.7, 287.34, 789, 801, 814; 501/153–155
See application file for complete search history.

(56) References Cited

U.S. PATENT DOCUMENTS

| 4,235,291 | A | 11/1980 | Messenger |
| 5,580,379 | A | 12/1996 | Cowan |
| 6,755,905 | B2 | 6/2004 | Oates et al. |
| 6,835,244 | B2 | 12/2004 | Oates et al. |
| 2005/0172860 | A1* | 8/2005 | Davidovits et al. .......... 106/602 |
| 2006/0278131 | A1 | 12/2006 | Hunt |

FOREIGN PATENT DOCUMENTS

| CN | 1209459 | 3/1999 |
| JP | 55034653 | 3/1980 |
| WO | 83/01947 | 6/1983 |

* cited by examiner

*Primary Examiner*—Timothy J. Kugel
(74) *Attorney, Agent, or Firm*—Bachman & LaPointe, P.C.

(57) ABSTRACT

A synthetic glass family in the quaternary phase field of CaO—SiO2-Al2O3-MgO (CSAM) with hydraulic and pozzolanic properties for use in differing applications in the gas and oil well cementing area. A method of making a mud-to-cement (MTC) slurry and a method for treating oil and gas wells with the MTC slurry containing a homogenous amorphous synthetic glass made from a mixture of inorganic materials selected from the group consisting of CSAM, wherein the cementing glasses with the mixture of inorganic materials are in a 100% amorphous phase with a degree of crystallization of zero.

40 Claims, 5 Drawing Sheets

HOMOGENOUS SYNTHETIC MUD-TO-CEMENT CEMENTING GLASSES

BACKGROUND OF THE INVENTION

This invention relates to cementing oil and gas wells, more particularly, to the manufacturing of a new synthetic glass family in the quaternary phase field of CaO—SiO2-Al2O3-MgO (CSAM). The new synthetic glass family can be used for conventional cementing oil and gas wells operations, for instance to replace the blast furnace slag in mud-to-cement (MTC) technology and also for the construction areas.

Blast furnace slag (BFS) is a by-product produced in the manufacturing of iron, iron ore, iron scrap and limestone fluxes or dolomite fluxes. BFS is nonmetallic and consists primarily of silicates, aluminosilicates and calcium-alumina-silicates. Since slag is a by-product of the manufacturing of iron, the exact chemical composition of the slag is difficult to measure. Differing forms of BFS may be produced by the method used to cool the BFS. BFS may be cooled by rapid water quenching to obtain a granulated slag with cementitious properties.

Due to its cementitious properties BFS has been mixed with Portland cement and water based drilling fluid to create cement slurries that exhibit superior strength and increased thermal and chemical stability over conventional oil well cements. BFS is a commercial by-product that is generally available from slag processors located near iron manufacturing centers. BFS must therefore be imported to regions of the world that do not have blast furnace technology or do not produce iron.

When BFS or Portland cement is mixed with water based drilling fluids a unique cementing technique known as mud-to-cement (MTC) is created. A water based drilling fluid is mixed with the BFS, and/or Portland cement and activators. The mixture is then transformed into cementitious system.

In steam injection techniques and other oil extraction processes that require increased well temperatures, the cementing material used must be able to withstand elevated temperature and thermal cycling associated with steam flood. The conventional Portland cement and also the water based drilling fluids mixed with Portland cement exhibit high thermal degradations. This degradation damages the well resulting in repairs which increase operation costs. In steam injection techniques, the mixture of water based drilling fluids and BFS for MTC technology exhibits a higher compatibility and lower thermal degradation than Portland cement. As a result, BFS is preferred over Portland cement for MTC.

In some regions of the world where steam injection techniques are employed, BFS is not readily available and is therefore imported. The high costs associated with importing BFS compounded by the unknown heterogeneous chemical composition of the BFS, unknown remaining crystalline phases in the BFS and the potential need for an additional milling process is a disadvantage suffered by regions of the world that do not produce BFS.

As a result, there is a need for an economical BFS replacement in regions of the world that do not produce BFS. The new synthetic cementing glass of the present invention may replace BFS in any well cementing operation. The synthetic glass of the present invention is an advantageous well cementing constituent that may be successfully implemented in differing temperature dependent processes, such as the steam injection technique employed for heavy crude oil extraction.

SUMMARY OF THE INVENTION

The primary object of the present invention is the creation of a new synthetic glass family in the quaternary phase field of CaO—SiO2-Al2O3-MgO (CSAM) with hydraulic and pozzolanic properties. The synthetic glass family exhibits superior chemical and physical properties as compared to BFS.

It is a further object of the present invention to provide a method of making MTC slurries by replacing BFS with a 100% amorphous material of high purity and zero crystallization.

It is still a further object of the present invention to produce MTC slurries which consists of using the new homogeneous synthetic glass family in order to develop cementing systems with better chemical and physical properties compared to the systems currently used in differing well cementing operation applications.

It is still a further object of the present invention to produce a homogenous amorphous synthetic glass from a mixture of inorganic materials selected from the group consisting of CaO, MgO, SiO2, Al2O3, Fe2O3, and Na2O+K2O.

In accordance with the present invention a MTC fluid is disclosed which comprises a mixture of inorganic materials selected from the group consisting of CaO, MgO, SiO2, Al2O3, Fe2O3, Na2O+K2O, wherein the mixture is in the amorphous phase with a degree of crystallization of zero; a high pH solution; a liquid phase, such as a water based drilling fluid; powdered amorphous silica; and antifoam additive.

In further accord with the present invention a method of producing a MTC slurry is disclosed which comprises the steps of: manufacturing a synthetic glass by activating the synthetic glass by reaction with a high pH solution, mixing the synthetic glass with water based drilling fluids, powdered amorphous silica, and adding an antifoam additive. The synthetic glass is created by mixing inorganic materials selected from the group consisting of CaO, MgO, SiO2, Al2O3, Fe2O3 and Na2O+K2O; melting the mixture of inorganic materials; quenching the mixture of inorganic materials, wherein the glass materials reach the amorphous phase with a degree of crystallization of zero; and, milling the quenched mixture of inorganic materials.

In yet further accord with the present invention a method for treating subterranean oil and gas wells is disclosed comprising the steps of creating MTC slurries by mixing a first additive, second additive, third additive and fourth additive; and, deploying the MTC fluid into a subterranean well. The first additive is a synthetic glass created by obtaining inorganic minerals; mixing; melting; and quenching the inorganic minerals to obtain a synthetic glass that reaches the amorphous phase with a degree of crystallization of zero. The synthetic glass consists of inorganic materials selected from the group consisting of CaO, MgO, SiO2, Al2O3, Fe2O3 and Na2O+K2O. The second additive is a high pH solution comprising caustic soda and soda ash. The third additive is water based drilling fluids and the fourth additive comprises antifoam and silica flour.

BRIEF DESCRIPTION OF THE DRAWINGS

A detailed description of preferred embodiments of the present invention follows, with reference to the attached drawings, wherein.

DETAILED DESCRIPTION

Figure 1:
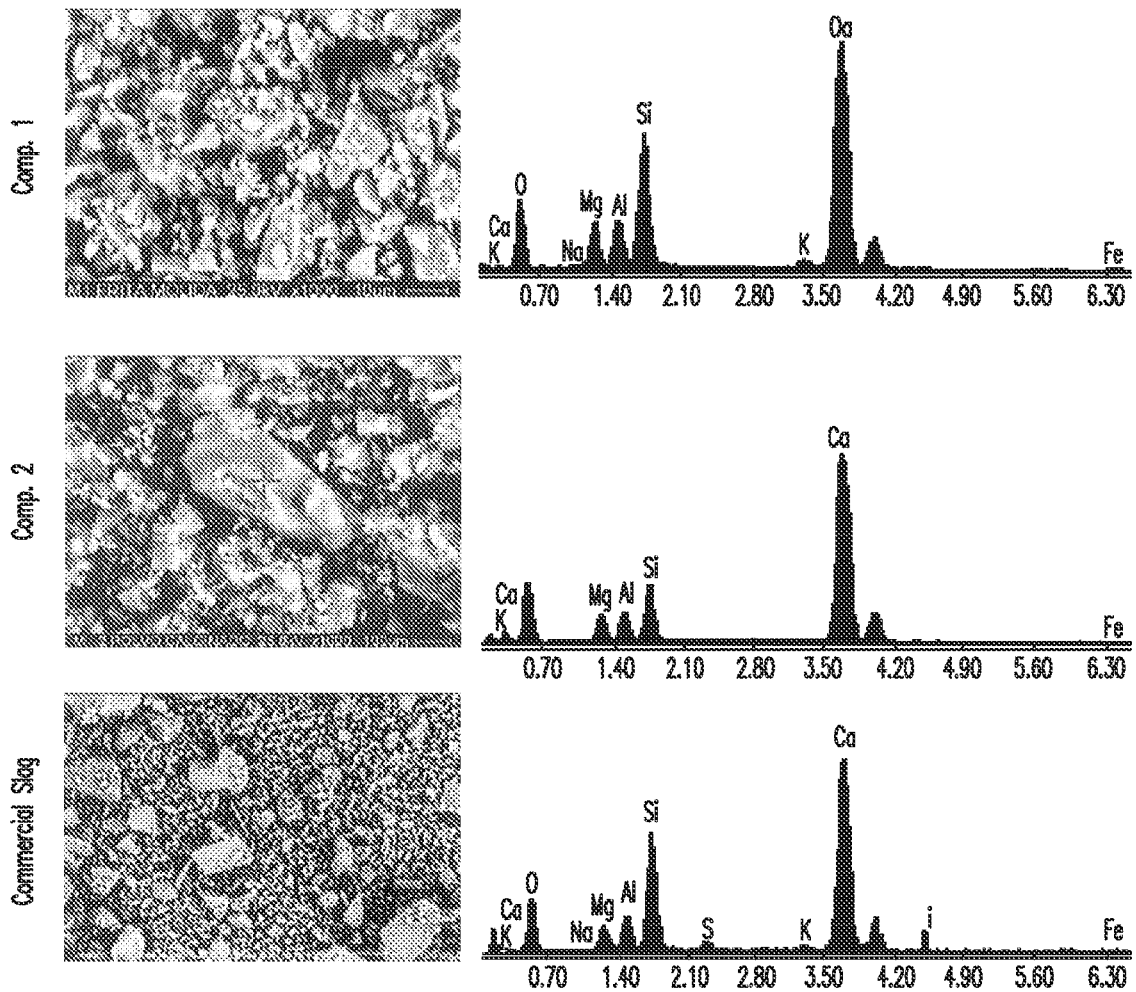
FIG. 1 illustratively compares through scanning electron microscopy and energy scanning calorimetry the inventive Composition 1 and inventive Composition 2 to commercial BFS.

The invention relates to the synthesis of a cost effective 100% amorphous material, i.e. a material that exhibits zero crystallization, with a pure chemical composition that is cooled at a sufficient rate to avoid crystallization. The cost effective amorphous material is a synthetic glass that controls the thermal behavior of cementitious materials used for conventional cementing and/or blended cement manufacturing. In one preferred embodiment, an amorphous material is used to replace MTC blast furnace slag (BFS).

Hereinafter the term "synthetic glass" is used to refer to any one or all of the following terms: amorphous material, homogeneous synthetic glass, synthetic glass family, synthetic glass materials and/or cementing glasses.

The synthetic glass of the present invention comprises a pure chemical composition in the quaternary phase field of CaO—SiO2-Al2O3-MgO (CSAM). The CSAM system is derived from readily obtainable inorganic materials.

In order to achieve a synthetic glass with a known homogenous chemical composition, the readily attainable raw inorganic minerals are first mixed. Hereinafter, the terms "inorganic materials" and "inorganic minerals" are used interchangeably to indicate the raw starting materials used to synthesize the synthetic glass. The inorganic materials may be waste catalytic materials, synthetic zeolite, and/or natural zeolite. They may be blast furnace metallurgical slags and/or electrical arc furnace slags related to metal manufacturing, such as ferro-nickel, ferro-vanadium and ferro-silicium. They may also be minerals, such as kaolin, silica, dolomite, calcium carbonate and the like. These inorganic materials may be obtained from commercial powders or granulates. The inorganic materials may be mixed in any fashion that is well known within the art.

The inorganic materials of the present invention can be mixed in any manner which is known to a person skilled in the art. Within this scope, examples of particularly suitable mixing procedures include dry mixing; wet mixing; and, wet mixing of disperse inorganic mineral slurries that are then dried before melting.

To produce a synthetic glass of a desired composition, the exact chemical compositions of the starting inorganic materials can be identified by differing physical and chemical analysis. The exact chemical composition of certain suitable starting inorganic materials for use in the present invention were measured by scanning electron microscopy (SEM) and chemically analyzed by energy disperse spectroscopy (EDS) and the results are shown in Table 1.

TABLE 1

Chemical compositions by SEM and EDS of the raw inorganic materials in % weight/weight (w/w) used to obtain the synthetic glass.

| Compounds | Dolomite % | Ca carbonate % | Kaolin % | Silica % |
|---|---|---|---|---|
| $CaCO_3$ | 53.7899 | 95.4950 | — | 0.0100 |
| $MgCO_3$ | 41.6000 | 0.8323 | 0.8300 | 0.0069 |
| $SiO_2$ | 1.9000 | 2.5000 | 66.9800 | 97.6900 |
| $Al_2O_3$ | 2.2000 | 1.0000 | 29.7900 | 2.1200 |
| $Fe_2O_3$ | 0.3383 | 0.1235 | 0.3600 | 0.0257 |
| $Na_2O$ | 0.0403 | 0.0135 | 0.5300 | 0.0607 |
| $K_2O$ | 0.1120 | 0.0190 | 1.2000 | 0.0807 |
| $TiO_2$ | 0.0200 | 0.0167 | 0.3100 | 0.0230 |

Exact ratios of the starting inorganic minerals measured in Table 1 can be mixed to produce a cementing glass with the CSAM theoretical ranges presented in Table 2 as desired according to the invention.

TABLE 2

Chemical composition of the CSAM system of the cementing glass in % w/w.

| Oxides | Theorical range (%) |
|---|---|
| CaO | 30~50 |
| MgO | 1~18 |
| $SiO_2$ | 28~38 |
| $Al_2O_3$ | 8~24 |
| $Fe_2O_3$ | 1-3 |
| $Na_2O + K_2O$ | <2 |

The synthetic glass of the present invention is a homogenous glass of high purity. The purity of the synthetic glass depends upon the inorganic minerals used to form the glass. If the glasses are produce from raw waste catalysts, such as synthetic zeolitic waste material from a catalytic process in a fluidized bed, small amounts (parts-per-million) of waste chemicals may be found in the final composition. These waste chemicals, such as nickel (Ni), cerium (Ce), lanthanum (La) and vanadium (V) may be found in the final synthetic glass composition. Irregardless of the waste minerals used to create the synthetic glass, the glass is composed to contain greater than 90% glass content in the CSAM system of Table 2, with preferably greater than 95% glass content in the CSAM system of Table 2.

After the raw inorganic materials are mixed in appropriate ratios to achieve the desired CSAM composition, the inorganic materials are then melted. In manufacturing scenarios, the melting may take place in any furnace that is well known within the art, such as a gas furnace. To facilitate melting, the composition is heated to a temperature of 1150° C. to 1550° C. for a period of 2 to 4 hours. The material is heated until all inorganic materials are in a homogeneous liquid phase. The inorganic material of the present invention can for example be melted in a platinum crucible at 1500° C. for approximately 3 hours.

The hot homogeneous liquid phase is then quenched, for example in water at 20° C. The temperature of the hot homogeneous liquid phase is reduced at an extreme rate to avoid crystallization. Any quenching method that is known to a person of skill in the art may be used. Such as a quenching method that utilizes fast movement and/or agitation of the hot homogeneous liquid phase into water cooling equipment, such as water sprays or water drums. An example of a quenching method in accordance with the present invention is the fast agitation of the hot homogeneous liquid phase into 20° C. water, which reduces the temperature of the liquid glass by greater than 500° C. per second (° C./s). This extreme rate of quenching is employed to suppress the crystallization of the homogeneous liquid phase.

Once the synthetic glass is formed and cooled, the glass is then dried. A conventional drying oven was used in the present invention; however, any drying method that is well known within the art may be used to eliminate the remnant water after quenching.

Once the synthetic glass is dried, the glass is then milled. Any milling equipment for mineral processing that is known to a person skilled in the art may be used, such as ball milling equipment, pendular milling equipment, roller milling equipment, and others. One particularly suitable approach to milling in accordance with the present invention is milling through the use of ball milling equipment. The milling is preferably carried out to produce a particle size of less than 45 μm with a Blaine fineness of between 2500-7000 cm²/g.

The method detailed above was used to create two experimental chemical glass compositions: Composition 1 and Composition 2. Both Composition 1 and Composition 2 have specific CSAM compositions as shown in Table 3 below. These compositions are compared to the composition of a sample of commercial slag.

TABLE 3

Chemical composition of Composition 1 and Composition 2 as compared to the commercial slag in % w/w.

| Oxides | Comp. 1 (%) | Comp. 2 (%) | Commercial Slag (%) |
|---|---|---|---|
| CaO | 42.31 | 40.60 | 41.80 |
| MgO | 10.25 | 10.45 | 8.05 |
| SiO$_2$ | 32.34 | 37.10 | 34.11 |
| Al$_2$O$_3$ | 12.20 | 9.85 | 10.10 |
| Fe$_2$O$_3$ | 1.30 | 1.00 | 0.80 |
| Na$_2$O + K$_2$O | 1.60 | 1.00 | 1.15 |
| TiO$_2$ | — | — | 0.97 |
| SO$_3$ | — | — | 2.51 |
| MnO | — | — | 1.00 |

Since commercial slag is a by-product of iron production each sample is heterogeneous and may have a differing composition. Due to the heterogeneous nature of commercial slag the degree of crystallization and level of iron oxide content are unpredictable. The iron oxide content in the commercial slag affects the amorphous degree of the slag which in turn affects hydraulicity index of the commercial slag. Since each batch of commercial slag is heterogeneous in nature and variable, the commercial slag composition given in the present application is a generalization of one sample of a commercial slag. This heterogeneous nature can be undesirable, for example a commercial slag with a large iron oxide concentration will affect the hydraulicity index of the resulting fluid.

The exact chemical contents of Composition 1 and Composition 2 where analyzed by EDS. The averages shown above in Table 2 were calculated from ten measurements for each sample.

FIG. 1 details the SEM and EDS analysis of Composition 1, Composition 2 and the sample of commercial slag. Composition 1 and Composition 2 exhibit a homogenous synthetic glass content of high purity.

As shown in Table 3 and FIG. 1, the commercial slag may contain any number of contaminants from the iron manufacturing.

Composition 1 and Composition 2 where analyzed and compared to the commercial slag sample through differential scanning calorimetry (DSC), thermal gravimetric analysis (TGA), and x-ray diffraction (XRD).

Simultaneous differential scanning calorimetry (DSC) and thermal gravimetric analysis (TGA) measurements were performed using a 20° C./min heating rate. The correct ratios of the inorganic raw minerals were mixed to obtain the final synthetic glasses Composition 1 and Composition 2. The samples were placed in a platinum pan. An empty platinum pan was used as a reference. The data may be recorded by any method that is well known within the art; however, the data in the present invention was recorded using a computer-driven data acquisition system.

Figure 2:
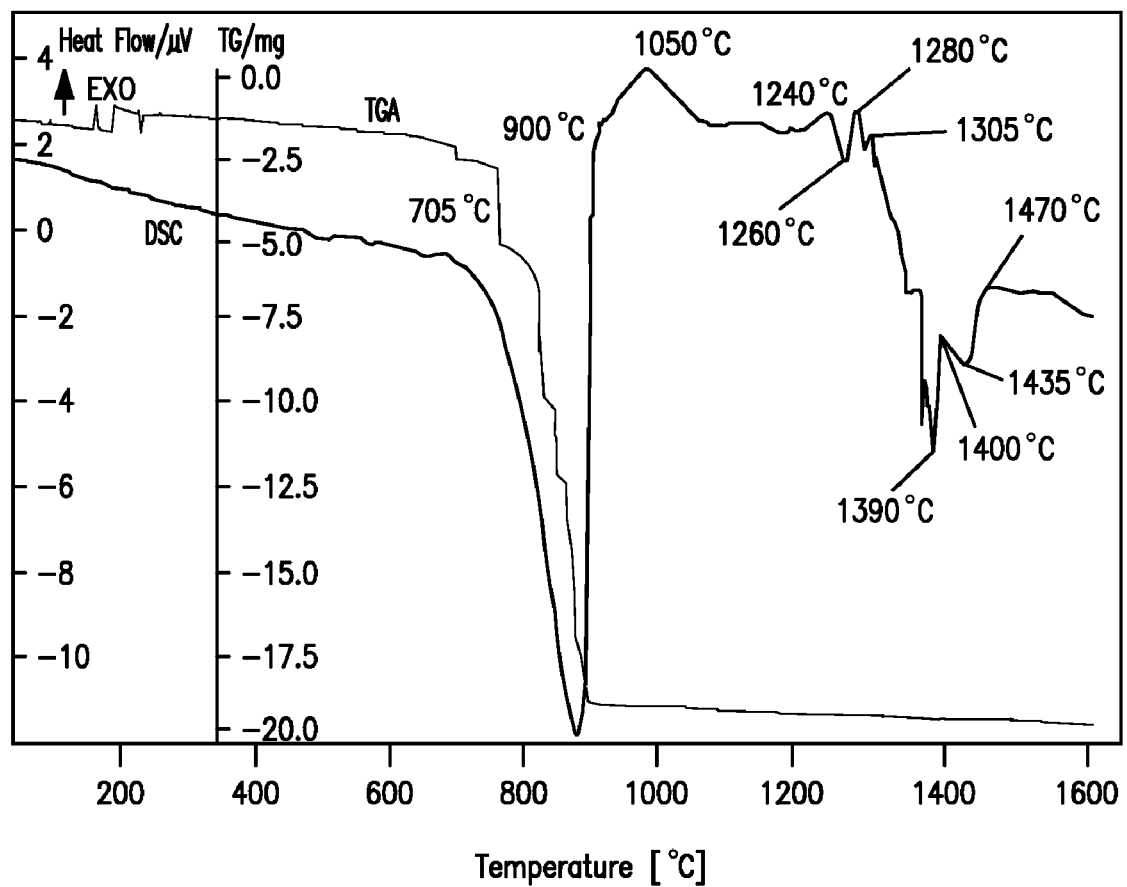
FIG. 2 graphically depicts the thermal gravimetric analysis and differential scanning calorimetry of inventive Composition 1.
Figure 3:
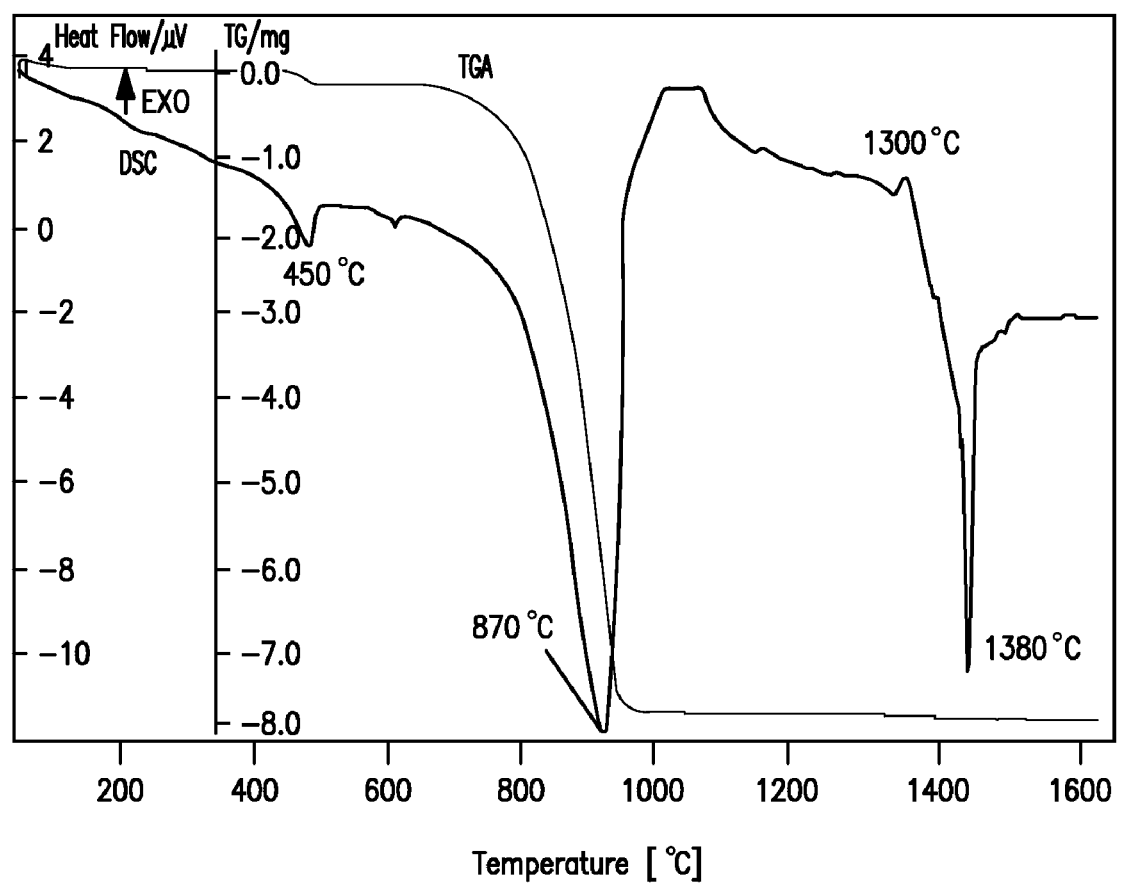
FIG. 3 graphically depicts the thermal gravimetric analysis and differential scanning calorimetry of inventive Composition 2.

FIGS. 2 and 3 detail the data obtained through DSC and TGA. The simultaneous DSC/TGA analysis of Composition 1 and Composition 2 was performed to obtain the decomposition and transformation temperatures for each specific final synthetic glass composition.

FIG. 2 shows the DSC/TGA curves of the minerals mixed to formulate Composition 1. The powders of kaolin, dolomite and calcium carbonate were mixed at specific ratios to formulate Composition 1. Table 2 shows the exact percentages of the CSAM system in Composition 1.

In FIG. 2 the TGA curve of Composition 1 shows a very strong mass loss at temperatures between 705-900° C., that correspond to calcium carbonate (CaCO3), and dolomite MgCa (CO3)2 decomposition. After 900° C. a very low slope change is observed and related to a final step of CO2 residual gas-separation during the melting (1260-1470° C.) which continues to the final temperature analyzed (1600° C.). These reactions can be represented as:

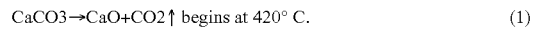
$$CaCO3 \rightarrow CaO+CO2\uparrow \text{ begins at } 420° \text{ C.} \quad (1)$$

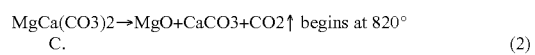
$$MgCa(CO3)2 \rightarrow MgO+CaCO3+CO2\uparrow \text{ begins at } 820° \text{ C.} \quad (2)$$

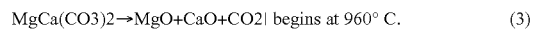
$$MgCa(CO3)2 \rightarrow MgO+CaO+CO2\mid \text{ begins at } 960° \text{ C.} \quad (3)$$

In FIG. 2 the DSC curve of Composition 1 shows differing events. The first event occurs at the same temperature as the TGA curve first event, between 705-900° C., where endothermic peaks are reported and related to the solid state reactions between calcium and magnesium oxides generated during the CaCO3 and MgCa (CO3)2 thermochemical decomposition to form magnesium and calcium silicates with a final exothermic peak at about 1050° C. These reactions can be represented as follows:

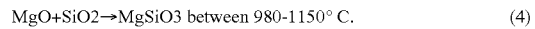
$$MgO+SiO2 \rightarrow MgSiO3 \text{ between } 980-1150° \text{ C.} \quad (4)$$

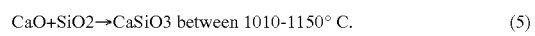
$$CaO+SiO2 \rightarrow CaSiO3 \text{ between } 1010-1150° \text{ C.} \quad (5)$$

Additionally, the following reaction can occur:

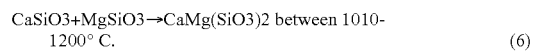
$$CaSiO3+MgSiO3 \rightarrow CaMg(SiO3)2 \text{ between } 1010-1200° \text{ C.} \quad (6)$$

The second event is related to the melting step that shows a group of exothermic peaks indicating a sequential melting of diverse phases. This step begins at 1260° C.

The third and final event is related to a temperature of about 1450° C.

The multiple TGA and DSC reactions exhibited by Composition 1 are related to the dissolution of silicates and the reaction with other aluminum phases obtained from the kaolin decomposition. The high melting point of this mixture can be attributed to the incorporation of about 12.20% of kaolin in the final glass. The high aluminum content of the kaolin raises the melting temperature of the composition.

FIG. 3 shows the TGA/DSC curves of the minerals mixed to formulate Composition 2. The powders of kaolin, dolomite, calcium carbonate and silica sand were mixed at specific ratios to formulate Composition 2. Table 2 shows the exact percentages of the CSAM system in composition 2.

In FIG. 3 the TGA curve of Composition 2 exhibits the typical curves for carbonate decomposition that ends at 870° C. As seen by equations (1)-(3) above, this is where the first solid reaction with the production of CaO and MgO take place. The slope up to 900° C. indicates crystallization and fusion of the phases produced by the heat of the solid reaction, showing only two principal peaks.

In FIG. 3 the DSC curve of Composition 2 exhibits a first endothermic peak at 450° C. related to the dehydroxylation of kaolin and formation of metakaolinite. The reaction can be represented as follows:

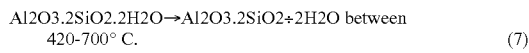

$$Al_2O_3 \cdot 2SiO_2 \cdot 2H_2O \rightarrow Al_2O_3 \cdot 2SiO_2 + 2H_2O \text{ between } 420\text{-}700° C. \qquad (7)$$

In FIG. 2 synthetic glass Composition 1 shows a crystallization event observed at temperatures higher than 900° C. (exothermic peak). This is related to the formation of calcium and magnesium silicates. In FIG. 3, Composition 2 exhibits a lower melting temperature (with a specific endothermic peak at 1380° C.) than the melting temperature indicated by FIG. 2 of Composition 1. The specific endothermic peak of 1380° C. is the temperature at which the heat flow of Composition 2 shows a total transformation from solid to liquid. The reduction in the melting point of Composition 2 improves the synthesis of synthetic glass materials. Reducing the melting point reduces energy consumption and is directly related to the final production cost.

Additionally, as shown in Table 3 below, Composition 2 shows a lower density than both Composition 1 and the sample of commercial slag. This effect can be attributed to the decrease in the amount of aluminum phases and the increase of SiO2 in the composition. The synthetic glass compositions of the present invention may exhibit a density of about 2.80 g/cc to about 2.95 g/cc, preferably about 2.80 g/cc to about 2.85 g/cc.

After producing and chemically characterizing the synthetic glasses, some of their physical properties were measured and compared with those of the commercial slag. In order to predict the hydraulic activity (latent) and to understand the strength retrogression phenomenon in these systems, the Hydraulic Index (HI) and the CaO/SiO2 ratio were calculated and are shown in Table 3. Also the density of both cementing glasses and the commercial slag are reported.

TABLE 3

Additional properties of Composition 1 and Composition 2 as compared to the sample of commercial slag.

| Properties | Glass Comp. 1 | Glass Comp. 2 | Commercial Slag |
|---|---|---|---|
| Density (g/cc) | 2.85 | 2.83 | 2.90 |
| CaO/SiO$_2$ ratio | 1.30 | 1.09 | 1.22 |
| Hydraulicity* | 2.00 | 1.70 | 1.76 |

*Hydraulic Index = (CaO + MgO + Al$_2$O$_3$)/SiO$_2$ ≥ 1.0 [5]

In Table 3, the CaO/SiO2 ratio is given as X CaO to 1 SiO2. For example the Cao/SiO2 ratio for Composition 1 is 1.30 CaO to 1 SiO2.

Figure 4:
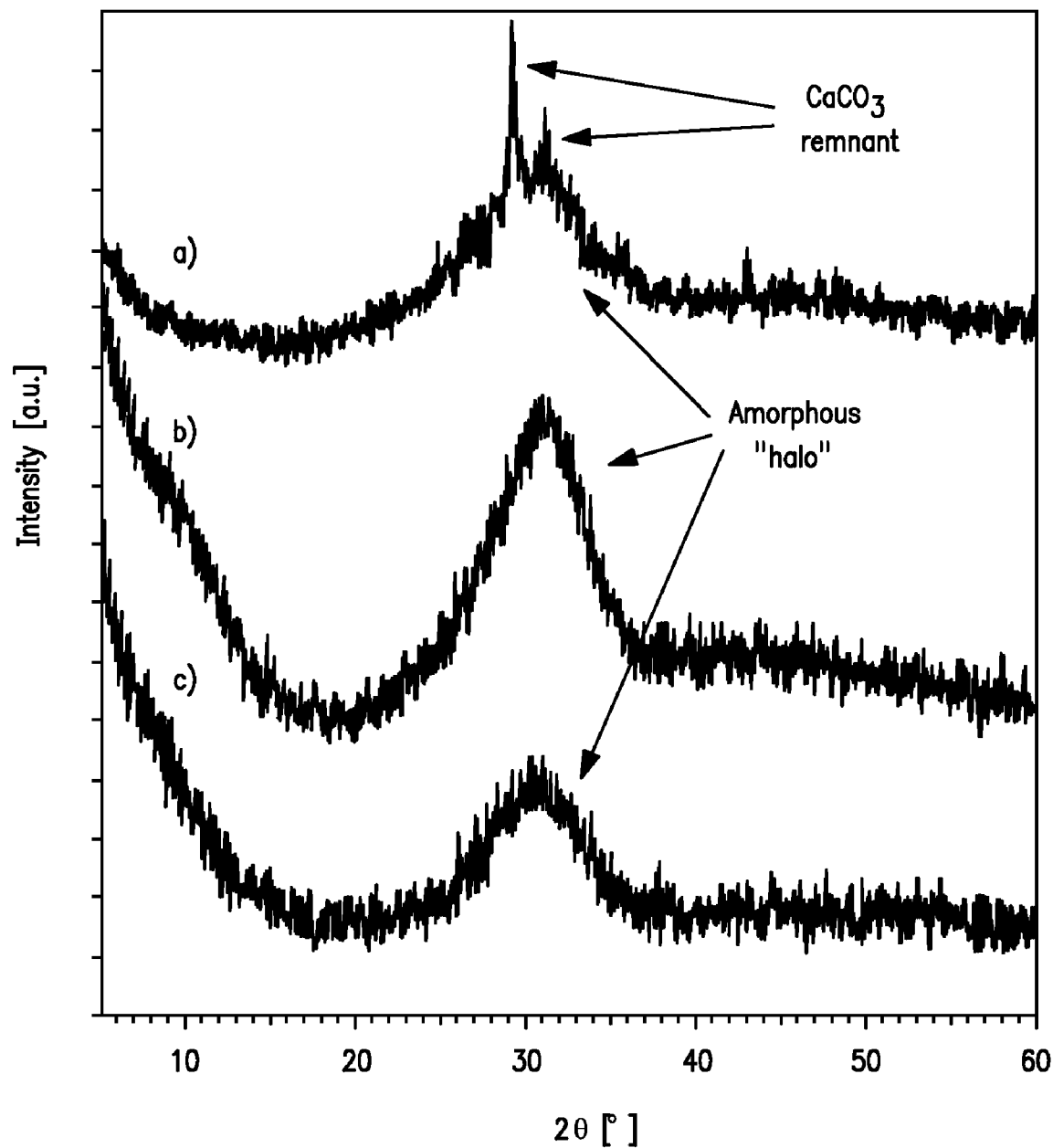
FIG. 4 graphically compares through X-ray diffraction the residual crystalline phases of the inventive Composition 1 and inventive Composition 2 to commercial BFS.

The amorphous degree and residual crystalline phases of Composition 1 and Composition 2 as compared to the sample of commercial slag are identified through XRD diffraction patterns in FIG. 4. The amorphous degree of the synthetic glass is considered to be the most significant variable and certainly the most critical for hydraulic activity (latent). Several factors influence the vitrification degree achieved by the quenching, but the most important variable influencing the nature of the glasses is the temperature at which the furnace is tapped. The rate of quenching of greater then 500° C./s, which influences the glass formation, is thus the predominant factor affecting the strength of cementing glasses.

In FIG. 4, plot (b) represents Composition 1 and plot (c) represents Composition 2. (b) and (c) graphically depict that Compositions 1 and 2 are in total amorphous phases without any remnant crystalline phases; therefore, the degree of crystallization is zero. This may be attributed to the melting procedure of the mixture of inorganic minerals and the fast quenching rate.

In FIG. 4, plot (a) represents the sample of commercial slag. (a) graphically depicts the residual crystalline phase of calcium carbonate (CaCO3) in the commercial slag. The residual crystalline phase of the commercial slag may be attributed to the heterogeneous nature of the commercial slag composition, the quenching rate and the glass content of less than 90%.

Figure 5:
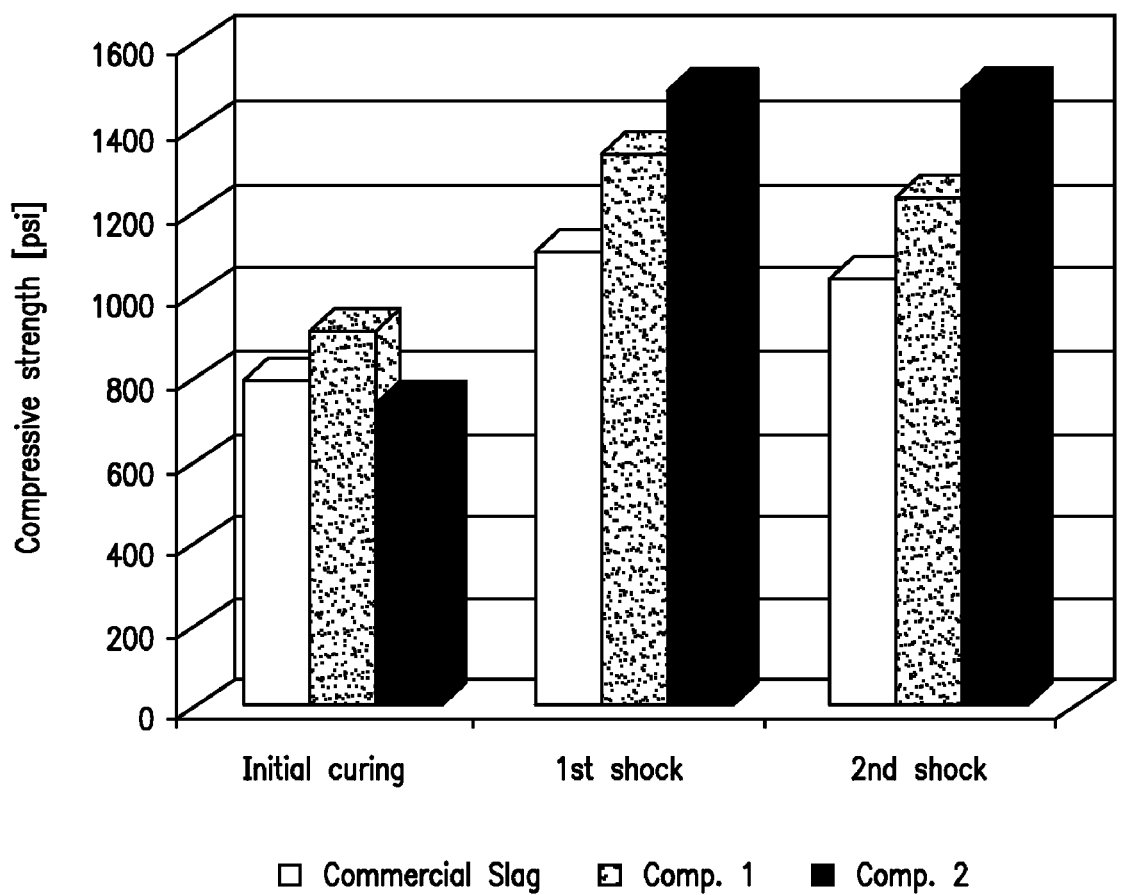
FIG. 5 graphically compares the thermal shock on compressive strength of the inventive Composition 1, inventive Composition 2 and commercial BFS.

FIG. 5 illustrates the compressive strength for Composition 1 and Composition 2 as compared to the sample of commercial slag.

The compressive strength is the most important property of cementing materials and is frequently used as a quality control. In FIG. 5, data is presented from measurements taken initially twenty-four hours after curing and then after each subsequent thermal shock cycle. The compressive strength measurements from the initial curing and subsequent thermal shocks are performed by any method which is well known within the art. The compressive strength measurements of the current invention were taken using an Ultra Sonic Analyzer (UCA) curing chamber.

An important step during the BFS and cementing glasses hydration is the development of mechanical properties at the initial curing. The hydration of these systems leads to their partial dissolution in the mixing water and to the precipitation of an amorphous calcium silicate hydrate (CSH gel) (i.e. poorly crystalline and amorphous calcium silicate hydrate of indefinite composition), aluminate and silicoaluminate hydrates. Normally, an augmentation of the Al2O3-content increases the early strength of the cementing system.

In FIG. 5, the synthetic glass Composition 1 shows the higher Al2O3-content from Table 2, a higher hydraulic index from Table 3 and the highest compressive strength during the initial curing.

FIG. 5 indicates that the cementing glass Composition 2 is more thermally stable than Composition 1; however, both cementing glasses show higher compressive strength values than the commercial slag sample evaluated. This can be attributed to the homogeneous amorphous chemical composition of the synthetic glasses that show low amounts of iron by-product contaminant. This factor plus the Blaine fineness between 2500-7000 cm$^2$/g of the CSAM system, influence the cementitious/pozzolanic efficiency when they are used specifically for the MTC fluid.

It is well known within the art that during the hydration of diverse cementing/pozzolanic materials, the CSH gel contributes a large portion of mechanical properties and stability to the final structure. CSH gel is very stable below 230° C. At higher temperatures the CSH gel is transformed into a hydrate dicalcium alphasilicate (α-C2SH) phase that is highly crystalline, denser than CSH gel and produces a compressive strength loss with a permeability increase once the cementitious materials set.

This phenomenon is known as "strength retrogression." To prevent the α-C2SH formation, powdered amorphous silica, i.e. silica flour, is used to adjust the CaO:SiO2 ratio. The silica flour stimulates the formation of tobermorite (C5S6H5) and xonotlite (C5S6H) phases. The tobermorite and the xonotlite phases form instead of the α-C2SH phase. By replacing the α-C2SH with the tobermorite and xonotlite phases a cement with high mechanical properties is produced. The amount of silica flour used in the slurry is dependent upon the CaO:SiO2 ratio. An appropriate amount of silica flour is added to the slurry in order to maintain the CaO:SiO2 ratio as close to 1 as possible. Typically the slurry may incorporate between about 20% w/w to about 45% w/w silica flour.

The CaO:SiO2 ratios of Compositions 1, 2 and the commercial slag are calculated from Table 2 to be 1.30:1 for Composition 1, 1.09:1 for Composition 2 and 1.22:1 for the commercial slag sample. FIG. 5 indicates that Composition 1 and the commercial slag show strength retrogression after the first thermal shock, but Composition 2 does not show strength retrogression after the first initial shock. This may be attributed to the increase of silica in Composition 2. The CaO:SiO2 ratio for Composition 2 is closer to one, which is a requirement for cementing systems with minimal strength retrogression.

Example 1

Exact ratios of the differing raw materials previously characterized by SEM and EDS in Table 1 are mixed to obtain Composition 1 with 42.31% w/w CaO, 10.25% w/w MgO, 32.34% w/w SiO2, 12.20% w/w Al2O3, 1.30% w/w Fe2O3, 1.60% w/w Na2O+K2O. The homogenous mixture is melted in a platinum crucible at 1500° C. for 3 hours. The liquid is then quenched in water at 20° C. to suppress crystallization. The synthetic glass is then milled to a controlled particle size of less than 45 µm.

Example 2

Exact ratios of the differing raw materials previously characterized by SEM and EDS in Table 1 are mixed to obtain Composition 2 with 40.60% w/w CaO, 10.45% w/w MgO, 37.10% w/w SiO2, 9.85% w/w Al2O3, 1.00% w/w Fe2O3, 1.00% w/w Na2O+K2O. The homogenous mixture is melted in a platinum crucible at 1500° C. for 3 hours. The liquid is then quenched in water at 20° C. to suppress crystallization. The synthetic glass is then milled to a controlled particle size of less than 45 µm.

Example 3

Synthetic glass Composition 1 and/or Composition 2 prepared by the methods detailed in Examples 1 or 2 above are mixed with a liquid phase that could be used for the construction of steam injection wells. Examples of liquid phases include oil based drilling fluids and water based drilling fluids. Preferably the liquid phase is a water based drilling fluid, such as water-based muds, fresh water mud, sea water mud, salt mud, brine mud, lime mud, gypsum mud and oil-in-water emulsions. The mixture forms a slurry that is activated by reaction with a high pH solution, such as caustic soda and soda ash. In order to prevent strength retrogression, other compounds such as antifoam, silica flour and additional cementing materials are added to the slurry. These additional cementing materials may include any additives that are used to control cement properties, i.e. mechanical properties, thermal properties or chemical resistance to H2S or CO2. Examples of additional cementing materials are set retardants, plasticizers, glass microspheres and/or ceramic microspheres and straightening agents.

The resultant slurries can be a homogenous MTC system which, upon solidification, possesses increased strength. The resultant MTC slurries are advantageously deployed into subterranean wells by any method which is well known within the art. This allows the use of economical MTC slurries in areas that are remote from BFS production. Costs associated with the importation of BFS are alleviated by replacing BFS in MTC with the synthetic glass of the present invention.

The synthetic glass of the present invention may be implemented in other possible applications. The final physical and chemical characteristics of the synthetic glass of the present invention may be applied to conventional cementing well technology, blended cement manufacturing, bridge construction, dam construction, onshore/offshore construction, coastal infrastructure, and any application that may benefit from the cementitious/pozzolanic properties of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A mud-to-cement slurry comprising:
    particles of a synthetic glass comprising a mixture of inorganic materials selected from the group consisting of CaO, MgO, SiO2, Al2O3, Fe2O3 and Na2O+K2O, wherein the synthetic glass is in a 100% amorphous phase with a degree of crystallization of zero;
    a high pH solution;
    a liquid phase;
    powdered amorphous silica; and
    an antifoam additive.

2. The mud-to-cement slurry of claim 1, wherein the liquid phase is selected from the group consisting of oil based drilling fluid, water based drilling fluid and combinations thereof.

3. The mud-to-cement slurry of claim 2, wherein the water based drilling fluid is selected from the group consisting of water-based mud, fresh water mud, sea water mud, salt mud, brine mud, lime mud, gypsum mud and oil-in-water emulsions, and combinations thereof.

4. The mud-to-cement slurry of claim 1, wherein the inorganic materials are derived from minerals selected from the group consisting of waste catalytic materials, synthetic zeolite, natural zeolite, blast furnace metallurgical slag, electrical arc furnace slags, kaolin, silica, dolomite, calcium carbonate, and combination thereof.

5. The mud-to-cement slurry of claim 4, wherein the blast furnace metallurgical slag comprises ferro-nickel, ferro-vanadium, and ferro-silicium.

6. The mud-to-cement slurry of claim 1, wherein the mixture of inorganic materials consists of CaO, MgO, SiO2, Al2O3, Fe2O3 and Na2O+K2O.

7. The mud-to-cement slurry of claim 1, wherein the concentration of the CaO is from about 30% w/w to about 50% w/w, the concentration of the MgO is from about 1% w/w to about 18% w/w, the concentration of the SiO2 is from about 28% w/w to about 38% w/w, the concentration of the Al2O3 is from about 8% w/w to about 24% w/w, the concentration of the Fe2O3 is from about 1% w/w to about 3% w/w, and the concentration of the Na2O+K2O is less than 2% w/w.

8. The mud-to-cement slurry of claim 1, wherein the concentration of the CaO is from about 40% w/w to about 43% w/w, the concentration of the MgO is from about 10% w/w to about 11% w/w, the concentration of the SiO2 is from about 32% w/w to about 38% w/w, the concentration of the Al2O3 is from about 9% w/w to about 13% w/w, the concentration of the Fe2O3 is from about 1% w/w to about 2% w/w, and the concentration of the Na2O+K2O is from about 1% w/w to about 1.7% w/w.

9. The mud-to-cement slurry of claim 1, wherein the high pH solution comprises caustic soda and soda ash.

10. The mud-to-cement slurry of claim 1, further comprising set retardants, plasticizers, glass ceramic microspheres, ceramic microspheres, straightening agents and combinations thereof.

11. The mud-to-cement slurry of claim 1, wherein the density of the mixture of the inorganic materials is about 2.80 g/cc to about 2.95 g/cc.

12. The mud-to-cement slurry of claim 1, wherein the CaO:SiO2 ratio of the mixture of the inorganic materials is about 1:1.

13. The mud-to-cement slurry of claim 1, wherein the hydraulic index of the mixture of the inorganic materials is about 1.70 to 2.00.

14. The mud-to-cement slurry of claim 1, wherein the melting temperature of the mixture of the inorganic materials is about 1260° C. to about 1450° C.

15. The mud-to-cement slurry of claim 1, wherein the melting temperature of the mixture of the inorganic materials is about 1380° C.

16. The mud-to-cement slurry of claim 1, wherein the particle size of the mixture of the inorganic materials is less than 45 µm.

17. The mud-to-cement slurry of claim 1, wherein the compressive strength of the mixture of the inorganic materials at initial curing is higher than 500 psi at 24 hours.

18. The mud-to-cement slurry of claim 1, wherein the compressive strength of the mixture of the inorganic materials at a first shock is higher than 1100 psi.

19. The mud-to-cement slurry of claim 1, wherein the compressive strength of the mixture of the inorganic materials at a second shock is higher than 1200 psi.

20. The mud-to-cement slurry of claim 1, wherein the compressive strength of the mixture of the inorganic materials at the first shock and second shock is higher than 1400 psi.

21. The mud-to-cement slurry of claim 1, wherein the concentration of the powdered amorphous silica is present in an amount to maintain the ratio of CaO:SiO2 at about 1:1.

22. The mud-to-cement slurry of claim 1, wherein the concentration of the powdered amorphous silica is from about 20% w/w to about 45% w/w.

23. A method of producing a mud-to-cement slurry comprising the steps of:
manufacturing particles of synthetic glass by:
mixing inorganic materials selected from the group consisting of CaO, MgO, SiO2, Al2O3, Fe2O3 and Na2O+K2O, wherein the synthetic glass is in a 100% amorphous phase with a degree of crystallization of zero;
melting the mixture of inorganic materials;
quenching the melted mixture of inorganic materials;
drying the quenched mixture of inorganic materials;
milling the dried mixture of inorganic materials;
activating the synthetic glass by reaction with a high pH solution;
mixing the synthetic glass with a liquid phase;
adding powdered amorphous silica; and,
adding an antifoam additive.

24. The method of producing the mud-to-cement slurry of claim 23, wherein the liquid phase is selected from the group consisting of oil based drilling fluid, water based drilling fluid and combinations thereof.

25. The method of producing the mud-to-cement slurry of claim 24, wherein the water based drilling fluid is selected from the group consisting of water-based muds, fresh water mud, sea water mud, salt mud, brine mud, lime mud, gypsum mud, oil-in-water emulsions and combinations thereof.

26. The method of producing the mud-to-cement slurry of claim 23, wherein the inorganic materials are derived from minerals selected from the group consisting of waste catalytic materials, synthetic zeolite, natural zeolite, blast furnace metallurgical slag, electrical arc furnace slags, kaolin, silica, dolomite, calcium carbonate, and combination thereof.

27. The method of producing the mud-to-cement slurry of claim 26, wherein the blast furnace metallurgical slag comprises ferro-nickel, ferro-vanadium, and ferro-silicium.

28. The method of producing the mud-to-cement slurry of claim 23, wherein the mixture of inorganic materials consists of CaO, MgO, SiO2, Al2O3, Fe2O3 and Na2O+K2O.

29. The method of producing the mud-to-cement slurry of claim 23, wherein the concentration of the CaO is from about 30% w/w to about 50% w/w, the concentration of the MgO is from about 1% w/w to about 18% w/w, the concentration of the SiO2 is from about 28% w/w to about 38% w/w, the concentration of the Al2O3 is from about 8% w/w to about 24% w/w, the concentration of the Fe2O3 is from about 1% w/w to about 3% w/w, and the concentration of the Na2O+K2O is less than 2% w/w.

30. The method of producing the mud-to-cement slurry of claim 23, wherein the concentration of the CaO is from about 40% w/w to about 43% w/w, the concentration of the MgO is from about 10% w/w to about 11% w/w, the concentration of the SiO2 is from about 32% w/w to about 38% w/w, the concentration of the Al2O3 is from about 9% w/w to about 13% w/w, the concentration of the Fe2O3 is from about 1% w/w to about 2% w/w, and the concentration of the Na2O+K2O is from about 1% w/w to about 1.7% w/w.

31. The method of producing the mud-to-cement slurry of claim 23, wherein the melting step is performed at about 1500° C. for about 3 hours.

32. The method of producing the mud-to-cement slurry of claim 23, wherein the quenching step is performed in water at 20° C. at a rate less than 500° C./s.

33. The method of producing the mud-to-cement slurry of claim 23, wherein the milling step produces less than 45 µm sized particles with a fineness of about 2500 g/cm2 to about 7000 g/cm2.

34. The method of producing the mud-to-cement slurry of claim 23, wherein the high pH solution comprises caustic soda and soda ash.

35. The method of producing the mud-to-cement slurry of claim 23, wherein the compressive strength of the mixture of the inorganic materials at initial curing is higher than 500 psi.

36. The method of producing the mud-to-cement slurry of claim 23, wherein the compressive strength of the mixture of the inorganic materials at a first shock is higher than 1000 psi.

37. The method of producing the mud-to-cement slurry of claim 23, wherein the compressive strength of the mixture of the inorganic materials at a second shock is higher than 1400 psi.

38. The method of producing the mud-to-cement slurry of claim 23, wherein the concentration of the powdered amorphous silica is present in an amount to maintain the ratio of CaO:SiO2 at about 1:1.

39. The method of producing the mud-to-cement slurry of claim 23, wherein the concentration of the powdered amorphous silica is from about 20% w/w to about 45% w/w.

40. The method of producing the mud-to-cement slurry of claim 23, further comprising the step of adding set retardants, plasticizers, glass ceramic microspheres, ceramic microspheres, straightening agents and combinations thereof.

* * * * *